United States Patent [19]

Moran et al.

[11] Patent Number: 5,404,439
[45] Date of Patent: Apr. 4, 1995

[54] TIME-SPACE OBJECT CONTAINMENT FOR GRAPHICAL USER INTERFACE

[75] Inventors: Thomas P. Moran, Palo Alto, Calif.; Elin R. Pederson, Copenhagen, Denmark; Michael K. McCall, Menlo Park; Frank G. Halasz, Santa Cruz, both of Calif.

[73] Assignee: Xerox Corporation, Stamford, Conn.

[21] Appl. No.: 869,559

[22] Filed: Apr. 15, 1992

[51] Int. Cl.$^6$ .............................................. G06F 15/62
[52] U.S. Cl. ...................................... 395/155; 395/133
[58] Field of Search ........................ 395/155, 161, 133

[56] References Cited

U.S. PATENT DOCUMENTS

| | | | |
|---|---|---|---|
| 4,633,436 | 12/1986 | Flurry | 364/900 |
| 4,686,522 | 8/1987 | Hernandez et al. | 345/160 |
| 4,823,285 | 4/1989 | Blancato | 364/521 |
| 4,952,932 | 8/1990 | Sugino et al. | 341/23 |
| 4,984,152 | 1/1991 | Muller | 395/153 |
| 5,072,412 | 12/1991 | Henderson, Jr. et al. | 395/159 |
| 5,117,351 | 5/1992 | Miller | 395/650 |
| 5,208,907 | 5/1993 | Shelton et al. | 395/149 |

OTHER PUBLICATIONS

J. Maeda and B. Sabiston, "The Enhanced Paint Metaphor of Aninemo", Research Institute for Media Sciences, Tokyo, Japan, The MIT Media Laboratory, Cambridge, Mass., 2 page Handout.
Direct WYSIWYG Painting and Texturing on 3D Shapes, Pat Hanrahan and Paul Haeberli, Computer Graphics, vol. 24, No. 4, Aug. 1990, pp. 215-223.
Goodman, "The Complete Hypercard Handbook", Bantam Books (1987), pp. 17-63.
Research Disclosure #31940, p. 878 (Nov. 1990).
"MacDraw Pro User's Guide", Claris Corporation (1991).

Primary Examiner—Mark K. Zimmerman
Assistant Examiner—N. Kenneth Burraston
Attorney, Agent, or Firm—Rosen, Dainow & Jacobs

[57] ABSTRACT

A computer-controlled graphics display system providing improved means for selecting objects for joint action. The invention helps the user of a graphical user interface more easily select a group of objects that are meaningfully related to each other. Objects are usually created serially in time by a user, but they are typically selected by spatial grouping in graphical user interfaces. The invention shows that such a spatial grouping can be refined by considering the temporal grouping of objects. Algorithms are proposed which combine both spatial and temporal grouping to produce the most appropriate grouping of objects, i.e., groupings that most likely conform to the user's intentions.

19 Claims, 6 Drawing Sheets

TIME-SPACE OBJECT CONTAINMENT FOR GRAPHICAL USER INTERFACE

RELATED APPLICATION

Concurrently filed, commonly assigned, U.S. application Ser. No. 07/869,554, entitled "Generalized Wiping As A User Interface For Object-Based Graphical Displays."

BACKGROUND OF INVENTION

This invention relates to computer-controlled graphical drawing and editing systems and methods.

Graphical drawing and editing systems are generally of two kinds: painting programs and structured drawing programs. Painting programs allow the user to paint lines (or "spray" patterns) and erase on an image-based representation, usually a two-dimensional array of pixels. Structured drawing programs allow the user to create, modify, and delete geometrically-defined objects. An object-based representation, as distinguished from an image representation, has many advantages for computation, but the user interface to such a representation has typically used more discrete actions. While many drawing systems allow drawing and, for example, erasing of images with pen-based motions, it is accomplished on a pixel by pixel basis of the pixel-array image representation. Where object-based representations are used, erasing has been done by enclosing the object and then evoking a delete operation.

In graphical user interfaces to programs that work on object-based and other representations, there is a general user interface issue of how the user can select objects to operate on. Most graphical user interfaces provide spatial techniques for selecting objects. The user sweeps across the display to define a rectangle or draws a freehand loop. The rectangle or loop defines a spatial region of the display; the program computes which objects are contained in the region; and these become the selected objects.

The containment calculation needs to know how much of an object's area or extent needs to be properly contained within the region in order to be selected. In practice, programs are able to set useful and workable thresholds for the amount of containment, and so this is a manageable problem. Because these techniques select every object within the region and don't select any objects outside the region, we call these pure spatial closure techniques.

Closure can be modified by groupings (or other higher level structures over the objects). If subsets of displayed objects are contained in groups (the groupings not necessarily being visibly represented), then one may want to treat the groups as wholes for the purposes of selection. That is, either all of the objects in a group are selected or none are. For example, if a group contains five objects and three are selected by pure spatial closure, then all five are selected. This can be seen as a modification of pure spatial closure. On the other hand, if the group is considered an object, then it is still seen as pure spatial closure, where the containment criterion for groups is somewhat different from the criterion for objects.

In this case the groups must be pre-specified and explicit. Sometimes the groupings are implicit, and further, the groupings can be different at different times and for different purposes.

SUMMARY OF INVENTION

An object of the invention is a method for dynamically selecting a group of objects displayed on a screen in a computer-controlled display for subsequent action.

A further object of the invention is a display system employing an input device for creating objects on a screen and for helping a user select a group of objects that are meaningfully related to each other.

Another object of the invention is a novel interface technique between a user and a display system allowing the user to select a group of objects on a display for being operated on in a similar manner.

The invention is based, on the discovery of a general set of techniques for helping the user of a graphical user interface more easily select a group of objects that are meaningfully related to each other. While objects are usually created serially in time by a user, they are typically selected by spatial grouping in graphical user interfaces. In accordance with one aspect of the invention, such a spatial grouping can be refined by considering the temporal grouping of objects. Algorithms are described which combine both spatial and temporal grouping to produce the most appropriate grouping of objects, i.e., groupings that most likely conform to the users intentions.

The novel object selection techniques described herein can be employed with conventional painting programs and structured drawing programs, which employ pixel-based images or object-based representations of the displayed objects, using conventional spatial closure techniques to select objects, such as by defining a rectangle or drawing a freehand loop to enclose the selected objects, herein defined as examples of an "object selector". What the invention accomplishes is to add a temporal criteria to the selection process so that the user's intentions are more readily achieved.

The novel selection techniques described herein are also applicable to the generalized wiping scheme described and claimed in the referenced related copending application in which the user sweeps an applicator, another example of an object selector, across the display to select objects in accordance with certain spatial criteria, and the generalized wiping technique will be described in detail below as a foundation for understanding the time-space closure grouping claimed in the present application.

The present invention will be better understood from the detailed description given herein below in conjunction with the accompanying drawings, which give by way of illustration only and not by limitation, preferred embodiments in accordance with the present invention.

DETAILED DESCRIPTION OF PREFERRED EMBODIMENTS

Figure 1:
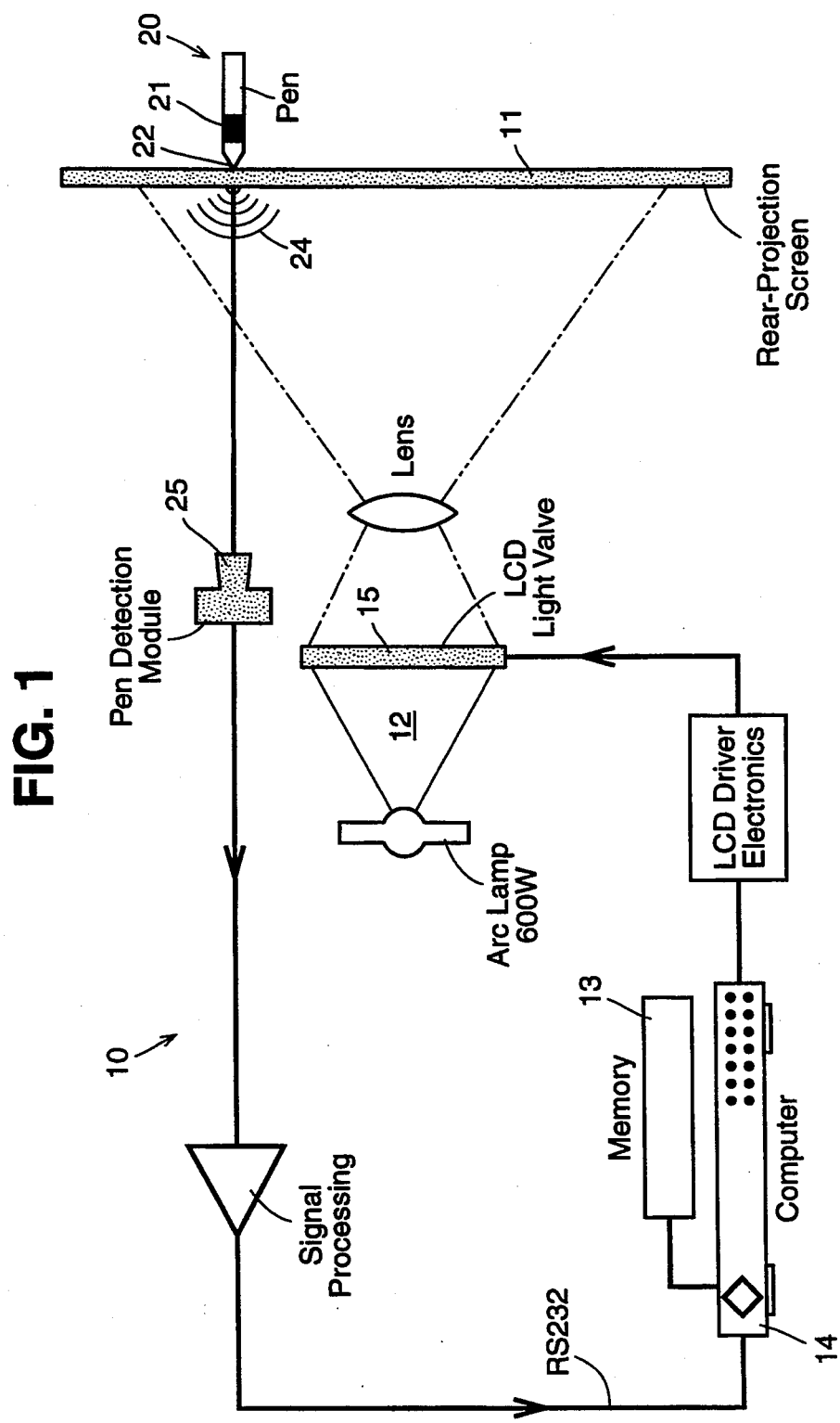
FIG. 1 is a block diagram illustrating one form of computer-controlled whiteboard in which the invention can be employed.

FIG. 1 schematically illustrates a whiteboard 10 of the type described in a paper on a large scale interactive display known as the Liveboard, described in a paper to be published in Proceedings of CHI, 92, the ACM Conference on Human Factors in Computing Systems, May 3–7, 1992, Monterey, Calif., with which the invention is particularly useful. Details of the whiteboard are not given as not essential to the invention. Suffice to say, the system illustrated comprises a display screen 11 with means 12 for projecting or displaying on the screen objects determined by and under control of a computer 14. In the Liveboard, the projection means simulates a TV projection system using a liquid crystal device 15 which creates the objects then projected onto and displayed on the screen 11. Associated with the system is a pen-like or similar drawing device 20, preferably cordless, and provided with means for controlling the beginning and ending of any pen motions. For example, as with digitizers or mouses, the pen can have buttons 21 which when clicked or released signals an action is to be taken. In addition, the pen can have a pressure-sensitive tip switch 22 which when pressed against the screen is recognized by the whiteboard as beginning or ending a pen action. The means for conveying these pen signals or commands to the whiteboard can be the same as those employed in digitizer tablets. As explained later, wiping is guided by a continuous motion-sensitive input device, so that it is a natural wiping motion for the user. By a "continuous motion-sensitive input device" we mean any input device that can be moved over the display surface (like a stylus) or moved over a surface that is electronically mapped onto a cursor on the display (such as a pen and tablet or a mouse). We simply refer to any such device here as a pen.

The whiteboard 10 must be able to recognize the position of the pen 20 on the screen 11, specifically its X-Y coordinates. This can be accomplished by mounting digitizer grids (not shown) behind the screen, and equipping the pen with electromagnetic, electrostatic or other means for cooperating with the digitizer grids to locate the pen position.

Alternatively, as in a touch screen, the pen can be equipped with means for generating a beam 24 of optical radiation which is imaged onto a detector module 25 located behind the screen. With this embodiment, which is preferred, the pen 20 need not be in contact with the display screen, but the user can provide input at some distance from the screen for remote pointing and gestural input. For further details on the construction and operation of such a system, the Liveboard paper referenced should be consulted.

As mentioned, the system includes a computer 14 with appropriate memory 13 for calculating or otherwise determining the location of the pen when signaled by the user, and is also capable of creating and storing under control of the user representations that can be displayed on the screen, in a way that is similar to that used by known graphical drawing and editing systems, Such as Paintbrush or Macpaint. However, in the system using the wiping scheme, each of the representations are object-based representations, as distinguished from an image-based representation, i.e., a 2-D pixel array. The ways of doing this are described at length in published literature on object-oriented deseign. As one example, which will help in understanding how the wiping motions can interact with a displayed object, an object instance can be viewed as a data structure, for example, a C struct or Pascal record, with object properties or attributes recorded in fields of the data structure that can include the coordinates of its screen position, its color, the thickness of lines defining the object, object fill patterns, the time of its creation, and so forth.

As an example, a typical data structure for a stroke object is shown below. In this example, a C++ class is illustrated. The object is described by a data structure and a set of operations on that data:

A stroke object may be described by the following data:

| | |
|---|---|
| pageN | the page of the document that the stroke is location on |
| pageX | the X and Y coordinates of the origin point of the stroke |
| pageY | on the document page |
| pageL | the layer of the page on which the stroke is located |
| Nsegments | number of segments in the path of the stroke ("segments" is explained below) |
| path: $dx_1, dy_1$ $dx_2, dy_2$ $dx_3, dy_3$ $dx_4, dy_4$ etc. | a list of dx, dy pairs describing the length and direction of each segment of the path that defines the shape of the stroke |
| color | a 3-component color code |
| transparency | of the color |
| thickness | of the stroke line |
| line style | style of line (e.g., dashed) |
| bounding box | the coordinates of the top, bottom, left, and right of the minimal rectangle enclosing the stroke (this is computed from the origin point, the path, and the thickness) |
| creation time | clock time at creation |
| last mod time | clock time of latest modification |
| groups | list of groups in which this stroke is included |
| tags | list of arbitrary tags attached to this stroke |
| property list | list of arbitrary attribute-value pairs |

Other kinds of objects would have some of the same fields as a stroke object as well as other fields unique to the object. As is well-known, object-oriented languages encapsulate the data representing the object with the methods required to display it or them. Display is achieved by the operating system sending a message to the object to display itself on the screen. Routines are available in C++ libraries for carrying out these functions of printing or displaying an object on the screen as well as other common functions.

Selection of objects can be made through use of any of its attributes. For simplicity, as background we will describe a preferred arrangement in which the object's X-Y coordinates are employed as the spatial selection criteria. One simple way of accomplishing the foregoing is to associate with the data structure representing each displayed object, or compute from its location coordinates in a known manner, a bounding box whose X-Y coordinates are stored in the object's data structure in memory.

Figure 2:
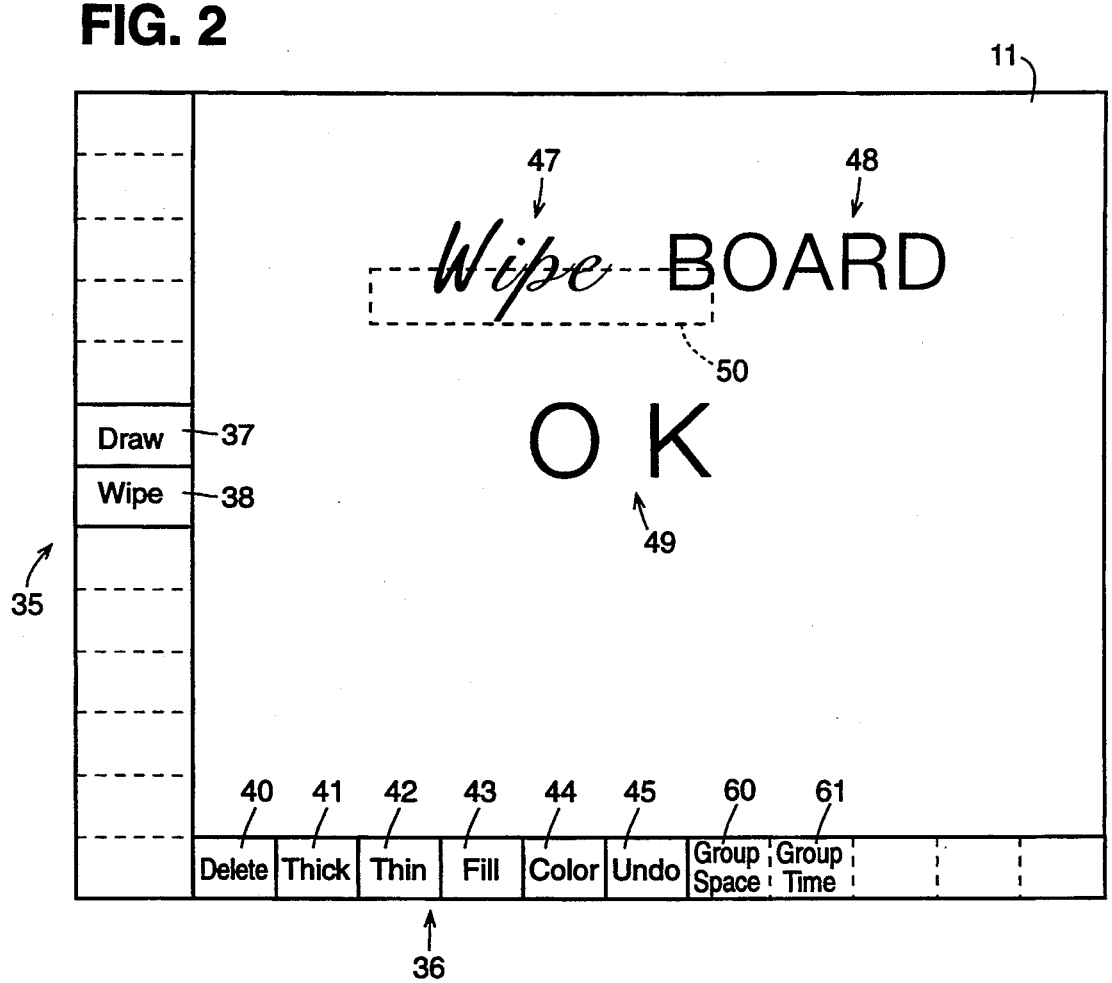
FIG. 2 is an elevational view of a screen display with software-controlled select buttons or icons displayed alone two screen edges, and with several objects on display.

We will assume in the description that follows that the user has created one or more objects that are displayed on the screen. As with the referenced graphics drawing programs, it is preferred for the display screen to display along its edges a series of buttons or icons that can be employed by the user to generate events for activating the software to implement user desires. FIG. 2 illustrates an example of one simple screen display with a set of buttons or icons for implementing the invention. The buttons/icons along the left screen edge 35 establish pen functions, and those 36 along the bottom screen edge determine the wiping operator. In the example illustrated, the pen functions are DRAW, WIPE, associated, respectively, with buttons 37 and 38. The buttons wiping operators shown, as an example only, are DELETE 40, THICKEN 41, THIN 42, FILL 43, COLOR 44, and UNDO 45. As is well known, when the user places the pen over or near a particular button or icon, and activates a pen switch or button, the computer can determine from the pen's location the function or operator chosen by the user.

FIG. 2 also shows on the screen several objects 47, 48, 49 created by drawing by the user after activating the draw button and a desired set width button (not shown). The objects displayed can each consist of a single drawing stroke by the user while a pen switch is activated. Alternatively, when polygons, circles or other shapes are created, the entire shape can be treated as a single object.

The way wiping works as a user interface is illustrated by the following scenario: The user with his pen touches a button 38 and enters "wipe mode". The system provides an applicator as the object selector. The user can then select the delete operator 40 to associate with the applicator, or by default, the applicator starts with a delete operator and thus is an eraser. The user erases a few objects by wiping, then touches the color button 44. A color spectrum (not shown) pops up and the user chooses the make-red button with the wiper. Wiping now turns objects red. After doing so to a few objects, the user notices that too many objects were mined red. The user "dips" the wiper into the Undo button 45, making Undo the operator. Then by wiping the objects that are not supposed to be mined red, they are returned to their original colors. Finally, the user exits from the wipe mode.

More formally, the components of wiping are as follows:

1. Applicator. The applicator as a data object has a shape and size which determines a path region. The path of the applicator, stored by the computer, is made up of a chain of straight line segments, the ends of which are the sensed locations of the pen. Thus the path region is made up of a chain of path region segments. For example, a rectangular cursor produces path region segments that are hexagonal (explained below). The applicator's shape and size can preferably be defined by the user, that is, be varied to accomplish different tasks.

2. Selection criteria. The abstract function of wiping is to select or group objects to be operated upon. Basically, the objects whose area intersects the wipe path region are selected, simply implemented in software by testing the coordinates of the bounding box of each displayed object for intersection (union) with those of the applicator's path region. However, there are other selection criteria that can be used for deciding whether an intersected object is actually selected. The simplest criterion is the intersection threshold, which measures the percentage of the object's area that is intersected by the wipe path region. The most liberal criterion is a non-zero intersection threshold, i.e., even the slightest touching of an object by the applicator causes it to be selected. A strict 100% threshold is usually not useful, but high, low, and majority (50%) thresholds have their uses. Note that the intersection threshold should be computed dynamically under these circumstances. A more rigorous description of how to determine selected objects by touching appears below. As a wipe proceeds, the wipe path grows and can intersect more and more of an object until it reaches threshold. For example, FIG. 2 illustrates in dashed lines wipe path region 50 formed by a user. Assuming the threshold was set at, say, 30 percent, the object 47 made up of one upper case character and separated group of three lower case characters would be selected. The initial upper case character of the next object 47 would also be selected. If the operator were DELETE, all three items would be erased. Since the erasure of the letter B was probably not intended, this is where the latter can be overridden by applying the UNDO operator to just the letter B.

There are other useful selection criteria, which are usually task-specific. Applicators are usually designed to be of a size and shape proportional to the kinds of objects that they are intended to select, and can be user defined. For example, an applicator intended to select the strokes of handwritten words is sized to be somewhat less than the height of the words so that a wipe can be easily be made across the words. Given this intent, a useful selection criterion is to reject any stroke that is too large to be part of a word. Thus, when a stroke depicting a box surrounding the words is wiped, it is not selected. Note that this criterion is much easier to compute than dynamic intersection thresholds.

Another example is in the case where the displayed objects are organized into a set of two-dimensional layers. Here, a specialized criterion could be to filter which objects are selected by which layers they are on.

3. Scoping wipe actions. There are four nested intervals of time that can be employed for defining the scope of wiping: the scope of the wipe session, the scope of the operator, the scope of the wipe stroke, and the scope of the stroke branch. (A) The largest scope is the wipe session. A wipe session consists of a series of wipe strokes and possible changes of operator. A wipe session is usually bounded by entering and leaving some sort of a wipe mode. (B) The wipe session is divided into one or more operator scopes. An operator scope is the duration of time during which the operator remains unchanged. The operator scope is made up of a series of wipe strokes. (C) Each wipe stroke is deemed by the pen device touching down on the display surface (or pen button being pressed), sliding along the display surface, and then pulling up from the surface (or releasing the button). (D) Branch scope: A stroke that has sudden reversals in direction is divided into "branches" by the reversals. E.g., a stroke with two reversals has three branches. The branch scope is thus the time of a branch. E.g., in the above example, they are from the beginning of the stroke to the first reversal, from the first to the second reversal, and from the second reversal to the end of the stroke.

4. Grouping selected objects. These intervals can be used to define a natural grouping on the objects selected. The set of objects selected by a branch is called a branch group; the set of objects selected by a wipe stroke forms a wipe stroke group; the set of objects selected by an operator scope defines an operator group; and the set of objects selected in a wipe session constitutes a wipe session group.

5. Dynamics of application. The computation of selected objects preferably takes place dynamically. While the user wipes with the pen input device, wipe stroke segments are produced and objects are selected, for example, by storing pointers to the objects in a suitable list, as they meet the selection criteria. Usually, the operator is applied to the objects as they are selected. For example, if the operator is deletion, then objects are deleted as the user wipes, simulating the effect of a physical eraser. However, the application of the operator can be delayed. One pattern of delay is to hold the application until a wipe stroke is completed and then to apply the operator to the wipe stroke group; another pattern is to delay until the wipe session is ended and apply the operator to the whole wipe session group.

6. Feedback for the wipe. There can be auditory and/or visual feedback to the user during the course of wiping. Auditory feedback can be used to signal when a wipe stroke is being created, when objects are selected, or when the operator is applied. Visual feedback can make the wipe strokes visible (e.g., as a light transparent background, like a highlight marker pen produces), or the objects selected can be highlighted in various ways (e.g., by a distinctive color or a shadow). The duration of visual feedback is usually to the end of the wipe session.

7. Operators applied. Many different kinds of operators can be applied to the objects selected. Here are examples of some of them to give an idea of the versatility of this interface technique and the range of possibilities:

Deleting, Cutting, Copying. As already noted, deleting selected objects simulates physical erasing. Cutting can be used not only to delete objects, but also to save them in a "clipboard" buffer for later use (such as Pasting somewhere else). Copying saves selected objects without deleting them.

Selecting, Grouping, Tagging. Wiping can be used purely for selection. After a wipe session, the wipe session group is saved for later use by the system. Wiping can also be used to group objects into higher-level structures by using the wipe stroke groups. For example, if the objects are the strokes of handwritten characters, wipe strokes can be used to structure the handwriting into items of a list. The tagging operator can be used to apply a distinguishing tag to objects, and wiping can be used for tagging. For example, if the objects are the strokes of handwritten characters, wiping can be used to tag subsets of these strokes as representing, say, important ideas or action items.

Changing object properties. Many operators change the value of object properties, e.g., color, position, orientation, scale, thickness. These are straightforward wiping operators. For example, in a window system, wiping could be used to apply a shrink operator that causes windows to go from full size to icon size.

Relative change operators. Some operators cause relative changes to objects, e.g., to make the color a bit darker, to move them up a bit, to rotate them a bit, to thicken them a bit. What distinguishes relative operators is that they can be applied iteratively to effect greater and greater change. Applying these operators by wiping raises the issue of how many times to apply them. Since a natural wiping motion is to wipe back and forth, an object may be selected more than once in the same wipe stroke. For an absolute operator, this is not a problem, since iterative application is redundant. One solution is only to allow a single application of the operator within the scope of wipe stroke or a branch scope or a wipe session.

Undoing. The general undo operator may also be applied to wiping. For example, suppose a make-red operator was attached to the applicator and the user wiped over several objects with it, but the user noticed that some objects were turned red that shouldn't have been. To fix this, the undo operator can be attached to the applicator and the objects incorrectly mined red are wiped, turning them back to their original color. Another example: Suppose the operator is delete, and some objects are erased by mistake. It is difficult to wipe with undo because the objects are gone. However, if the wipe path has been made visible, then this gives an indication where the deleted objects were located, and wiping these locations with undo brings them back.

The general user interface technique of wiping is thus defined by the combination of different values for these components. For a given application program, the application programmer can define a range of values for the components to produce a wiping user interface for the application. These choices must be built on an architecture or control structure that implements the dynamics and integrates them into the rest of the application program's user interface.

Once a range of component values is provided, they must be made available to the user to define the applicator. One simple, standard technique for this would be to provide a "wiper icon" with a property sheet as part of a set-up operation for the session. The user can open the wiper's property sheet and set values for, say, the following components:
applicator
selection criteria
operator
application dynamics
grouping
feedback where each component provides a menu of allowed values. For example, the user could set the wiper to have a large applicator that selects only annotation objects and moves them to a "comments list," where the objects are grouped by wipe strokes, and the dynamics are to make the move only after each wipe stroke, and the feedback is to make the annotation objects red as they are selected.

This property sheet technique may be more general than is needed in most applications. At minimum, the user should be able to select the operator (else it is not generalized wiping), and once selected, all other components can be set by the program with appropriate values. Thus all the user has to do is to select the operator, and this can be made easy to do. The most obvious way, as shown in FIG. 2, is to utilize the buttons, icons, or menu items that represent operators as part of the application program's user interface. The user moves the wiper icon to, say, a button to attach the operator represented by the button to the wiper.

To better understand how the user's wiping actions can influence the displayed objects, it would be helpful to describe in more detail the several kinds of events that drive the wiping algorithms used in the invention to implement various features described above. These events are initiated by physical actions of the user and are detected, as described above, by hardware and software. The events will be described as effected by a user with a pen in the preferred embodiment, or with a mouse connected in the usual way to the system. The latter would allow the user to manipulate the objects on the whiteboard while seated at a desk or table. The left column indicates the wiper event in boldface, and the right column explains what the user can do, as one example, to implement the command.

| | |
|---|---|
| Enter Wipe Mode | User signals that he wants to enter Wipe mode. This can be done several ways, such as by pushing a "Wipe Mode" button. |
| Exit Wipe Mode | User signals he wants to leave Wipe mode and go to another mode, say by pushing a "Draw" button. |
| Set Wiper Operator | User touches a button or icon denoting an operator that can be applied by the wiper. |
| Set Wiper Property | User touches a button or selects from a menu a setting for one of the properties of the Wiper. |
| Wiper Down | User manipulates the input device to signal that the Wiper is "in contact" with the display. With a pen device, this can be done by touching the display surface with the pen. With a mouse, it might be signalled by holding down a mouse button. |
| Wiper Up | User manipulates the input device to signal that the Wiper is "out of contact" with the display. With a pen device, this is done by lifting the pen from the display surface. With a mouse, it might be signalled by releasing the mouse button. |
| Wiper Move | User manipulates the input device to signal that the Wiper has moved to a new location on the display. (The system samples the location of the input device at frequent intervals and infers a move every time the location changes.) With a pen device, this is done by sliding the pen on the display surface while maintaining contact with the surface. With a mouse, this is done by sliding the mouse on the desk while holding the button down. |
| Wipe Path Reversal | User moves the input device in a direction that reverses its previous direction. A software algorithm can be used to detect this. |

These events can be used to partition time into several different scopes:

| | |
|---|---|
| Wipe Session Scope | From Enter to Exit. |
| Wipe Operation Scope | From Enter to the first SetOperator or from SetOperator to the next SetOperator or from SetOperator to Exit. |
| Wipe Stroke Scope | From Down to the next Up. |
| Wipe Segment Scope | From Down to the first Move or from Move to the next Move or from Move to Up. |
| Wipe Branch Scope | From Down to first Reversal or from Reversal to the next Reversal or from Reversal to Up. |

These scopes not only occupy time intervals, they also generate wiping objects.

The most primitive object is a wipe stroke Segment. It is a short line defined by its two end points, which are determined by two locations of the wiper. The wiper is preferably not a dimensionless point, but a solid 2D shape. Therefore, a segment is not just an idealized line with no thickness, but rather is a 2D shape defined by sliding the wiper along the idealized line.

Figure 3:
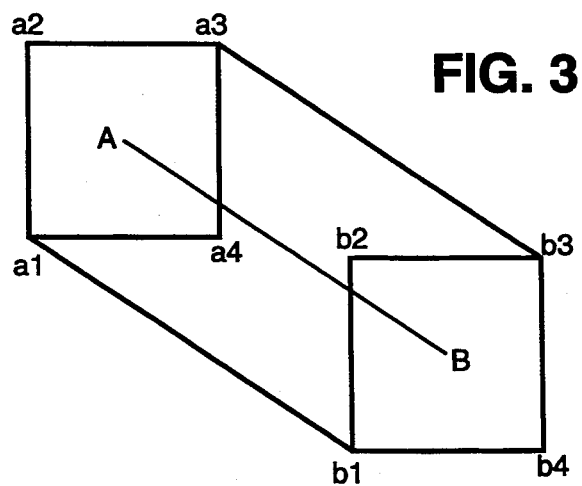
FIG. 3 illustrates one form of wiper applicator object in a sweep from A to B.
Figure 5C:
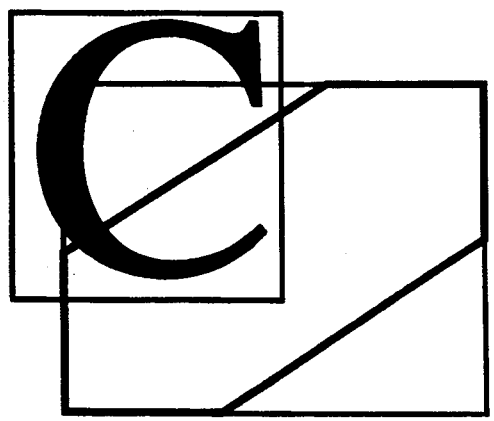
FIGS. 5A–5G are sketches illustrating the derivation of one form of target detection algorithm for implementing the invention.
Figure 5A:
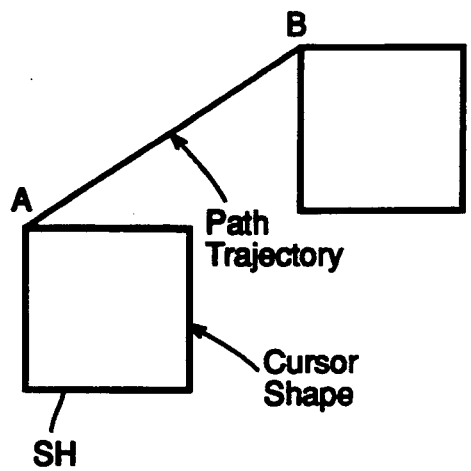
Figure 5B:
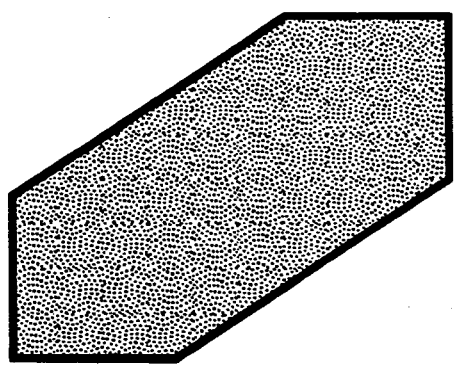
Figure 5D:
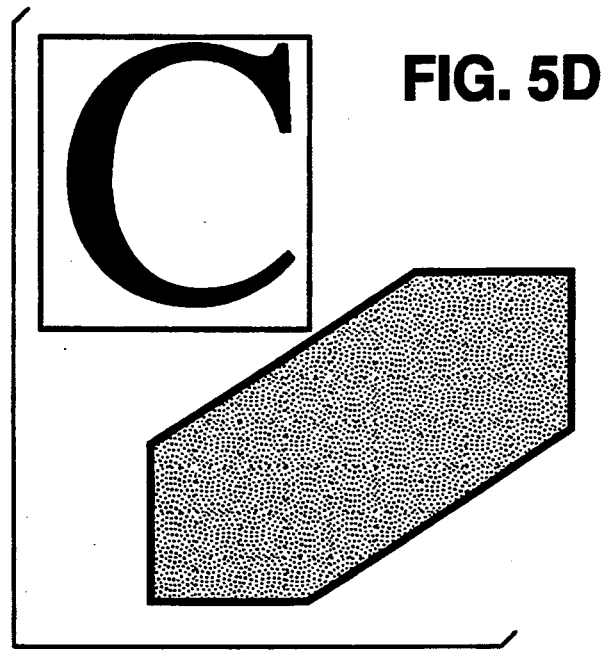

FIG. 3 gives an example. When the wiper is in the shape of a rectangle, a wipe Segment is in the shape of a hexagon, as can be seen in FIG. 5B. The wiper starts at idealized location A and then is detected at idealized location B. This Move event defines an idealized segment [A,B]. When at A, however, the wiper really covers the rectangular area [a1,a2,a3,a4]. Similarly, at B it covers [b1,b2,b3,b4]. Thus the wipe segment covers the hexagonal area [a1,a2,a3,b3,b1]. Note further that the definition of the hexagon depends on the direction of the move. If B was below and to the left of A, then the segment hexagon would be [a2,a3,a4,b4,b1,b2]. Note that this is just the simplest example of what a Segment is. A Segment may have a Wiper of any shape and size. The Wiper may change orientation as it is moved (e.g., to keep its orientation in line with the path vector). The Wiper could change properties as it is moved (e.g., the Wiper could change size or the Wiper's Operation could change definition in response to a pressure sensitive input device). Finally, the Wipe Segment path does not necessarily have to be straight; it could be a curve (e.g., a Bezier curve that smoothes the motion of a series of moves).

A Wipe Stroke is a sequence of segments. A Stroke's shape is simply the summation (union) of the shapes of all its segments.

A Wiper Operation is a set of Wipe Strokes.

A Wipe Session is a set of Wipe Operations. Note that a default Operator can be set upon Entering Wipe Mode. Thus, if the user never resets the Operator, then the whole Session can consist of just one Operation.

Figure 4A:
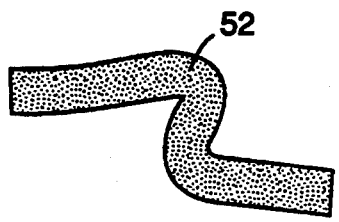
FIGS. 4A and 4B depict, respectively, two wiping strokes, one with and one without reversals or branches.
Figure 4B:
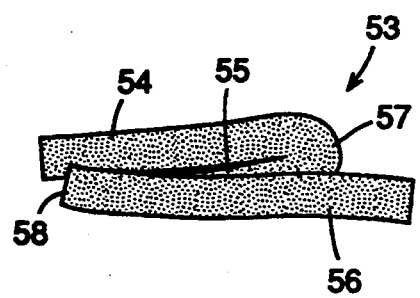

A Wipe Stroke Branch is more complex, because it can perform special functions. First note that a wipe stroke does not necessarily have to contain any branches. The notions of reversals and branches attempts to capture the user's motions of wiping back and forth over (roughly) the same area. A wipe stroke with no reversals would have only one branch. FIG. 4 depicts two possible wipe strokes. The left wipe stroke 52 shown in FIG. 4A has one branch as the stroke proceeds in one direction from left to right. The right one 53, shown in FIG. 4B, in which the user is clearly wiping back and forth, from left to right 54 to 57, then from right to left 55 to 58, and finally from left to fight again 56, has 3 branches 54–57, 55–58, and 56 and 2 reversals 57, 58. When there are reversals in the wipe stoke, then additional branches are defined. Each branch is a subsequence of segments. A reversal is readily detected by a reversal detection algorithm (described in more detail below) which simply tracks the coordinates of the wipe stroke and interprets a coordinate reversal as a branch.

The purpose of the wiping technique is to select target objects on the display (we call them target objects to distinguish them from wiping objects, such as the wipe strokes). The basic "engine" of the wiping technique is to determine what target objects are selected by a wipe segment. The list of selected target objects is called the Segment List.

The Segment List is calculated by a straightforward segment selection algorithm. The algorithm tests each target object on the display for whether its display area overlaps the area of the segment (this is done by a geometric computation on the shape and position of the target object and that of the segment). Whether a target object is selected is determined by the selection criterion. The simplest criterion is that the target object has a non-zero overlap with the segment. More complex selection criteria, as explained above, can be employed.

A Branch List is the aggregation of constituent Segment Lists. A Stroke List is the aggregation of constituent Branch Lists. An Operation List is the aggregation of Stroke Lists. And a Session List is the aggregation of Operation Lists.

These lists are accumulated dynamically and stored by the computer as the user performs physical wiping actions. The smallest unit of accumulation is the Segment List. However, only the new target objects in the Segment List are of use. But "new" can be relative to different things. It could be new relative to the Stroke List. Objects in the Segment List that are already in the Stroke List are "old." We want to reduce the Segment List by taking out the objects that are in the Stroke List. We call the result the Reduced Segment List (relative to the Stroke List). Usually, we want to operate on the objects in the Reduced Segment List. Then we want to add the objects in the reduced segment list to the stroke list.

One example of a suitable wiping algorithm for use in the invention follows below. Comments to explain some of the actions appears between double quotes following the action.

The algorithm uses the following variables:

| | |
|---|---|
| SegList | list of target objects |
| BranchList | list of target objects |
| StrokeList | list of target objects |
| OperationList | list of target objects |
| SessionStrokeList | list of StrokeLists |
| Operator | name of operator to be applied |
| ApplyAt | name of scope (Segment, Stroke, Operation, or SessionByStroke) at which Operator is to be applied |
| Feedback | name of operator to indicate which target objects were selected (eg: Shadow, Color, etc.) |

The algorithm is event-driven:

| EVENT | ACTIONS |
|---|---|
| Enter | empty OperationList and SessionStrokeList |
| Down | empty BranchList and StrokeList |
| | execute actions for a zero-length Move event |
| Move | calculate new SegList (using Segment Selection Algorithm) |
| | if Operator is relative and ApplyAt = Segment: |
| | reduce SegList by BranchList |
| | add reduced SegList to BranchList |
| | apply Feedback to reduced SegList |
| | apply Operator to reduced SegList |
| | else: |
| | reduce SegList by StrokeList |
| | add reduced SegList to StrokeList |
| | apply Feedback to reduced SegList |
| | if ApplyAt = Segment |
| | apply Operator to reduced SegList |
| | if this move is a Reversal: (using Reversal Detection Algorithm) |
| | empty BranchList |
| UP | execute actions for Move event |
| | put copy of StrokeList onto SessionStrokeList |
| | if Apply At = Operation: |
| | apply Operator to StrokList |
| | reduce StrokeList by OperationList |
| | add reduced StrokeList to OperationList |
| Operator | set Operator to name of designated operator |
| | if ApplyAt = Operation: |
| | apply Operator to OperationList |
| | empty OperationList |
| Property | set appropriate property of Wiper |
| Exit | if ApplyAt = Operation |
| | apply Operator to OperationList |
| | if ApplyAt = SessionByStroke: |
| | apply Operator to SessionStrokeList |

An example follows below of how to detect the reversal of direction in a wipe stroke. It tests only for horizontal reversals, which is the easiest way to reverse direction with arm movements on a large, vertical (whiteboard-size) surface. Thus it only considers the horizontal components (the X components) of wipe stroke segments. The four variables below characterize the state of the wipe stroke as it is being created:

fwdX distance moved forward in X direction
revX distance moved in reverse of forward X direction
newX length and X direction of newest segment
T threshold distance for establishing a direction (forward or reverse)

These variables keep track of a sense of forward (fwdX) and reverse (revX) direction in the wipe stroke. In order to filter out movement "noise", a threshold (T), is used to make sure the reversal has gone far enough to qualify as a genuine reversal of direction. When a wipe stroke is started (with a Down event), fwdX is initialized to 0. On each Move event, newX is set to the X distance of the current move stroke segment. Then the following tests are performed to detect if a reversal has taken place (TRUE means there is a reversal and FALSE means there isn't a reversal):

| | |
|---|---|
| if newX = 0 | //no movement in X direction |
| then return FALSE | //do nothing |
| if abs(fwdX) < T and | //forward direction not yet established |
| newX*fwdX < = 0 | //movement is nil or in opposite X direction |
| then fwdX = newX | //begin in new direction |
| revX = 0 | |
| return FALSE | |
| if newX*fwdX > 0 | //movement is in same X direction |
| then fwdX = fwdX + newX | |
| revX = 0 | |
| return FALSE | |
| if newX*fwdX < 0 | //movement is in opposite X direction |
| then revX = revX + newX | /cumulate reversal distance |
| if abs (revX) < T | //reversal distance less than threshold |
| then return FALSE | //not enough to count as a reversal |
| else | //reversal reaches threshold |
| fwdX = revX | //change forward direction |
| revX = 0 | |
| return TRUE | |

Those skilled in the art will recognize that the invention is not limited to the use of the specific algorithm described above, and other algorithms can readily be devised to implement the wiping action described herein. The fundamentals are simple. Determine which target objects are selected by testing against the wipe object and the currently active selection criteria. Implement the wiping action by modifying the relevant data structures representing the selected target object. For example, if the operator is delete, remove the object's data structure from the object list; if the operator is make-red, change the color attribute to red; if the operator is shrink, recompute the coordinates of the elements of the objects; and so forth.

There now follows a more rigorous description for finding an efficient way to determine which objects the stylus is touching at any time. We think of the user as specifying a path, which touches some objects and avoids others. Which objects are on the path? At the lowest level, a user's wipe action appears as a series of events. Most of these tell us of a new location to which the stylus has been moved. Since we have no more information, we represent a wipe "path" as the projection of the "applicator" cursor along a series of straight segments. These segments can be quite short. Since both the applicator cursor and the objects it is crossing can have substantial widths, it will often happen that several consecutive segments in a path touch the same object. We generally do not want to apply a given operation to an object more than once during a given stroke.

Referring to FIG. 5, given a set of objects, O, a cursor shape, SH, (FIG. 5A) and a pair of points A and B (which identify a segment), which of the objects is touched by the wipe segment that results from projecting SH along AB. To simplify, we entertain only rectangular cursors whose edges are parallel to the x and y axes. Henceforth, when we use the term "rectangle", we shall mean such a rectangle. And we only consider two types of objects, namely Characters and Strokes.

The path segment that results from projecting [the rectangle] SH along AB is a particular kind of hexagon, four of whose sides are parallel to the x and y axes. Henceforth, when we use the term "hexagon," we shall mean such an object. Note that such a hexagon come in two classes. One can be seen as running from the top/right to the bottom/left, the other from top/left to the bottom/right. In the first case we will call it a NESW-hexagon, and in the second a NWSE-hexagon. (A perfectly horizontal or vertical trajectory produces the degenerate case of another [larger in one dimension] rectangle.)

Figure 5E:
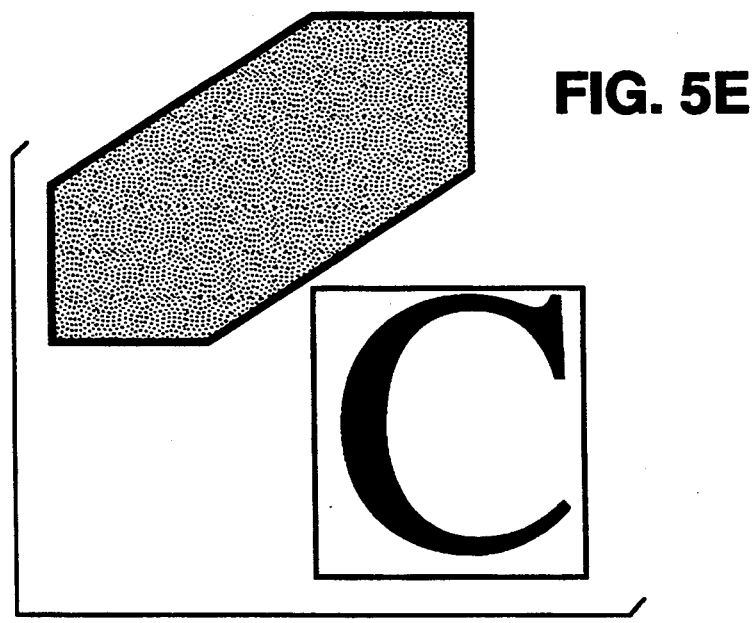
Figure 5F:
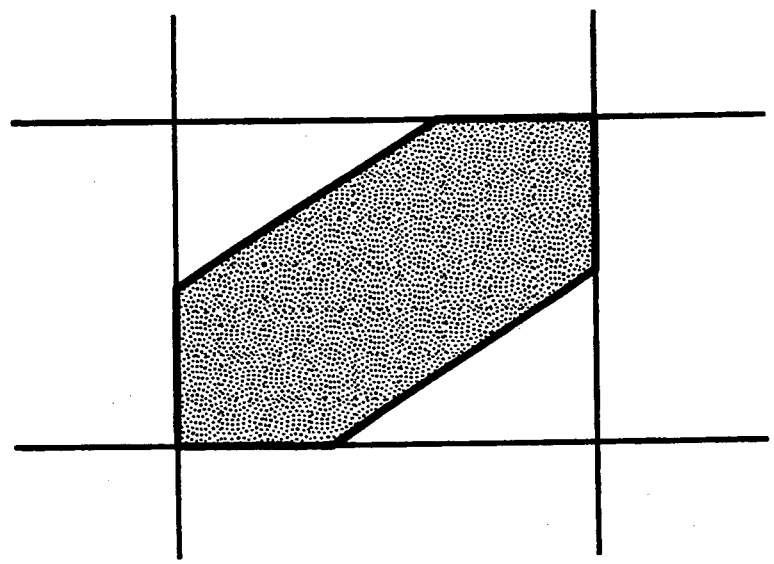

Consider Characters first. We will say that a wipe segment intersects a character if it intersects the character's "bounding box," the smallest rectangle that includes the character. So the question becomes whether a certain hexagon intersects a certain rectangle. See FIG. 5C. Let's look at the case of a NESW-hexagon. A hexagon itself has a bounding box, determined by its two most distant points. Since the hexagon is within its bounding box, it can't intersect the character unless the two bounding boxes intersect. So we check that first. Rectangle intersection is trivial. But intersection of the respective bounding boxes is not sufficient to insure that the hexagon intersects the character's bounding box. In the case of the NESW-hexagon, we could miss in either of two ways. How do we detect when we are in one of these situations? We are so just in case the bounding box's bottom-fight corner is "above" the hexagon's top "diagonal" (FIG. 5D), or the bounding box's top-left corner "below" the hexagon's bottom "diagonal". (FIG. 5E). These are simple enough computations. It is trivial to find the y-coordinate of any point on a line given its x-coordinate. So, to check for the first false positive (the "above" case), we ask for the point on the top diagonal that has the same x value as the right edge of the bounding box. If the bottom of the box is less than this y value, then we have a false positive. We make a similar check for the "below" false positive. So our character-segment intersection decision procedure looks like:

```
charBB = boundingBox (character)
hexBB = boundingBox (hexagon)
```

```
if (not intersect (charBB, hexBB))
return FALSE
if (bottom (charBB) < Yatx (rightEdge (charBB), topDiagonal (hexagon)))
return FALSE
if (top(charBB) > Yatx (leftEdge (charBB), bottomDiagonal (hexagon))
return FALSE
return TRUE
```

Now we want to consider how to tell whether a wipe segment hexagon intersects an arbitrary "Stroke". A stroke consists of some number of continuous line segments, all of the same width. Clearly, a stroke will intersect a hexagon just in case at least one of its segments does. So it is sufficient to just run through the segments, asking for each whether it intersects the hexagon. There is one easily overlooked detail. We must be careful to account not only for the width of the hexagon, but also for the (possibly large) width of the stroke. Since we said at the beginning that we would like the stroke to be erased as soon as the user "touches" it with the eraser, it will do to wait until the cursor hits the "middle" of the stroke. But this represents a fairly difficult computation. We choose to come very close to solving it at a much reduced computational price. Instead of deciding whether a fat line intersects a fat hexagon, we choose to decide whether a very skinny line intersects an extra fat hexagon. That is, we extend the hexagon by the width of the line. In all but very pathological cases, this will give nearly the same result. So, our high-level decision procedure for the stroke-hexagon intersection problem looks like:

```
strokeBB = boundingBox (stroke)
hex = extend(hexagon, width(stroke))
hexBB = boundingBox (hex)
if (not intersect (strokeBB, hexBB))/*Bbox check for easy ones*/
return FALSE
for (i = 1; i <+ numberOfSegments(stroke), ++i)
if (intersectSegAndHex (strokeSegment) (i, stroke), hex)
return TRUE
return FALSE
```

Figure 5G:
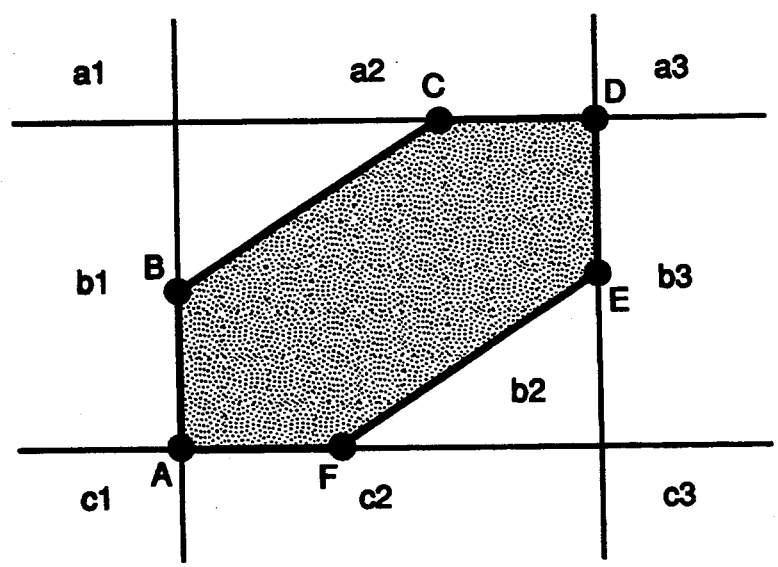

It remains only to give an algorithm for intersectSegAndHex(), i.e. to explain how to decide whether a segment intersects a hexagon. There are, no doubt, many approaches to this problem. We present here one example which we implemented. The arbitrary hexagon can be said to partition the plane into nine regions (like a huge tic-tac-toe game whose center square is the bounding box of the hexagon). See FIG. 5F. Let's call these nine regions "nonants" (by analogy with "quadrants"). Now, for any stroke segment, we can decide which of these nonants its endpoints lie in. (Say, arbitrarily, that liners are always in, i.e. that ambiguity is always decided in favor of the nonant nearest the center.) For ease of reference, let's label the nonants and the vertices of the hexagon as shown in FIG. 5G. Given the two nonants between which a segment runs, the intersection question may already be decided. For example, a segment running from b1 to b3 must intersect the hexagon, and one running from a1 to c1 cannot.

But there are plenty (23 to be fairly precise) more complicated cases. For example, the question of the intersection with a segment between b1 and c2 will turn on the same sort of "above/below" question we encountered in the character case, namely, is point A below the segment. Let's enumerate the interesting nonant pairs. Grouped by identicalness of decision procedure and ordered more or less in order of increasing complexity, they are Group 1: (a1,b3), (a2,b3), (a2,c3)
Group 2: (a1,c2), (c3,b1), (c2,b1)
Group 3: (a1,c3)
Group 4: (a2,c1), (a2,b1), (a3,b1)
Group 5: (a3,c2), (b3,c2), (b3,c1)
Group 6: (a3,c1)
UnGroupX: (b2, anything)

Let's take them in order. Our procedure for Group 1 will return True just in case point D is above the segment. That for Group 2 will return True if and only if point A is below the segment. Our procedure for Group 3 will return True just in case both point D is above the segment and point A is below it. That for Group 4 will return True if either point B or point C is above the segment. That for Group 5 will return True if either point E or point F is below the segment. A segment in Group 6 will intersect the hexagon if at lest one of the points B and C is above it and at least one of the points E and F is below it.

And this brings us to the remaining nine cases, which we've labeled UnGroupX. First, assume that only one of the endpoints is in b2. If that point is inside the hexagon, then clearly, the segment intersects the hexagon. Otherwise, the decision criteria will depend on whether the b2-resident endpoint is "above" or "below" the hexagon. We'll describe only the "above" case, since the "below" case is completely symmetrical. There are eight possible locations of the other endpoint (one for each of the nonants besides b2.) Let's break them into groups again.

GroupXa1: a1
GroupXa2: b3, c3, c2
GroupXa3: a2, a3
GroupXa4: b1, c1

Group Xa1 must simply return False. GroupXa2 can simply return True. GroupXa3 should return True if and only if point C is above the segment. And GroupXa4 should return True just in case point B is above the segment.

Finally, a segment both of whose endpoints are in b2 intersects the hexagon if and only if either at least one endpoint is inside the hexagon or both one endpoint is above it and the other is below it.

Here, then, is an only slightly abstracted rendition of the segment-hexagon intersection decision procedure:

```
if (segment is entirely above, below, left, or right of b2)
return FALSE
decide the nonant of both endpoints and see which group we're in
if (Group 1)
return pointAbove (D, segment)
if (Group 2)
return pointBelow (A, segment)
if (Group 3)
return pointAbove (D, segment) && pointBelow (A, segment)
if (Group 4)
return pointAbove (B, segment) || pointAbove (C, segment)
if (Group 5)
return pointBelow (E, segment) || pointBelow (F, segment)
if (Group 6)
return (pointAbove (B, segment) || pointAbove (C, segment))
&& (pointBelow (E, segment) || pointBelow (F, segment))
return decideUngroupX (segment, hexagon)
And the algorithm for decideUngroupX ( ) is:
if (a b2 endpoint is both below BC and above EF)/*inside hexagon*/
return TRUE
```

```
if (both endpoints are inside b2)
return pointAbove (oneEndpoint, BC) && (pointBelow(theOther, EF)
if (the b2 endpoint is above BC)
decide the nonant of the non-b2 endpoint & decide the group
if (GroupXa1)
return FALSE
if (GroupXa2)
return TRUE
if (GroupXa3)
return pointAbove (C, segment)
if (GroupXa4)
return pointAbove (B, segment)
else/*the b2 endpoint is below EF*/
decide the nonant of the non-b2 endpoint & decide the group
if (GroupXb1)/*c3*/
return FALSE
if (GroupXb2)/*a1, a2, or b1*/
return TRUE
if (GroupXb3)/*a3 or b3*/
return pointBelow (E, segment)
if (GroupXba4)/*c2 or c1*/
return pointBelow (F, segment)
```

We have illustrated and outlined the algorithms and decision procedures only for dealing with NESW-hexagons. Those for dealing with NWSE-hexagons are entirely symmetrical. Those for dealing with the rectangles that result from vertical or horizontal wipe trajectories are generally similar, with certain simplifications and specializations for dealing with vertical line segments (where division by zero is a danger.)

In accordance with the present invention, the concept of selection criteria of target objects can be expanded to include a time aspect.

The selection criteria of this aspect of the invention addresses the common situation where the objects are produced by the user in a temporal stream. In a drawing program the user creates objects and then subsequently has to select the objects to edit them. A more specific example is a drawing program that allows the user to draw strokes on the display with a pen-like input device. Strokes are the objects, and they are produced in a stream. Further, it is an empirical fact that there is a spatial orderliness to the way people draw (i.e. they typically do not produce strokes in random locations on the display). This suggests that temporal sequence is a clue to implicit grouping of objects that might make coherent selection that will capture the user's intentions.

Consider an example. The user creates five objects in order: A, B, C, D, E. These are in a spatial cluster, with object C on the edge of the spatial cluster. Later, the user intends to select the five objects but in effecting a sweeping action through the five, fails to intersect object C. By pure spatial closure only four objects are selected. However, the program can use the temporal production sequence as heuristic to decide to also include object C and thus select all five objects.

Given a set of objects in a temporal sequence (or with real-time stamps), a temporal interval that encompasses all those objects can be calculated. If all objects produced within the time interval can be found and they are included in the set, then this is called pure time closure.

However, pure time closure by itself is not a reliable clue to groupings that are meaningful to the user. People often go off on a "side track." For example, a user might produce A and B, then notice something to be corrected in another part of the drawing and produce C, then return to where A and B are and continue by producing D and E. In this case, C is not to be naturally grouped with A, B, D and E. The due for this is that C is spatially separated from the other objects. Thus, a combined time-space closure in accordance with this aspect of the invention needs to be calculated in order to produce reliable groupings that match user intent.

Thus, combining space and time criteria is useful in a variety of circumstances. Below are listed five cases showing examples of algorithms in accordance with the present invention for different situations. These algorithms use spatial and temporal "nearness" tests, algorithms for which are given after the five cases.

The following notation and definitions are used. The computer-based system consists of a collection of graphical objects. Each object has a location on the display. S indicates a spatial region on a display. The region can be defined by a user in many different ways (e.g., a drawing a loop or lasso, sweeping out a rectangle, a wipe stroke, or even just touching a point). C(S) indicates the spatial closure of S, i.e., the set of objects on the display selected by S, according to some selection criterion (e.g., that the objects are all located within S).

Each graphical object has a time associated with it. The time can be the time of creation, the time of last modification, the time of last reference, etc. Such times are usually kept on a history list.-But for our purposes here, we will simply say that the appropriate time is associated with each object as a property of the object. Analogous to S, T indicates a temporal region (i.e., a time interval). C(T) indicates the temporal closure of T, i.e., the set objects whose associated items are in T.

CASE 1: TIME INTERPOLATION OF SPATIAL SELECTION

This algorithm is useful in a situation where, e.g., a wipe selection is made, but where some intended objects were just missed by the wipe stroke.
1. S is given by some user action.
2. Calculate C(S). Set selection to C(S).
3. Calculate the smallest time interval, T, that includes selection.
4. Calculate C(T).
5. For each object in C(T) that is not in selection but is spatially near selection (according to the Spatial Nearness Test), add it to selection.
6. Return selection.

CASE 2: TIME EXTRAPOLATION OF SPATIAL SELECTION

This algorithm is useful in the same situation as Case 1. It can be used right after the Case 1 is used.
1. S is given by some user action.
2. Calculate C(S). Set selection to C(S).
3. Find the earliest time, $T_{min}$, of the times associated with the objects in selection.
4. Find the object, O, whose associated time is just before $T_{min}$.
5. If O is temporally near selection (according to the Temporal Nearness Test) and spatially near selection (according to the Spatial Nearness Test), then add O to selection and go back to step 3.
6. Find the latest time, $T_{max}$, of the times associated with the objects in selection.
7. Find the object, O, whose associated time is just after $T_{max}$.
8. If O is temporally near selection (according to the Temporal Nearness Test) and spatially near selection (according to the Spatial Nearness Test), then add O to selection and go back to step 6.
9. Return selection.

CASE 3: TIME CUES FOR PARTIAL SPATIAL INCLUSION

This algorithm is useful in the situation where a loop selection is made and a few objects are only partially selected in the loop (i.e., they are partly in and partly out of the loop). The algorithm decides whether the partially included objects are included or not.
1. S is given by some user action.
2. Calculate C(S). Set selection to C(S).
3. Calculate P(S), the set of objects partially selected by S (e.g., those objects only partially enclosed within S).
4. For each object in P(S) that is temporally near selection (according to the Temporal Nearness Test), add it to selection.
5. Return selection.

CASE 4: SPATIAL CHECKING OF EXPANDING TIME SELECTION

This algorithm is useful in doing backing up operations, i.e., operations that undo previous operations in a reverse time order (e.g., "backstroke" erases strokes in the reverse order of their creation). This algorithm provides a stopping criterion for detecting when it is probably inappropriate to continue backing up.
1. An object is given (usually the most recent object created or operated on). Consider it as a singleton set, C(T), in time interval T. Set selection to C(T).
2. Find the earliest time, $T_{min}$, of the times associated with the objects in selection.
3. Find the object, O, whose associated time is just before $T_{min}$.
4. If O is spatially near selection (according to the Spatial Nearness Test), then add O to selection and go back to step 2.
5. Else halt the expansion of selection.

In the previous cases, the process was from a spatial selection to form a collection of objects to modifying the collection using the space-time criteria. Case 4 is an example of an alternative process involving starting with a temporally-determined collection and then modifying it according to the space-time criteria. An example of the alternative is the user specifying the temporally-determined collection by a request for the most recently created objects.

CASE 5: DISENTANGLEMENT OF SPATIAL SELECTION USING TIME

This algorithm is useful in the situation where two groups of objects are spatially entangled, but where the two groups are clustered in time (e.g., a phrase is written producing a group tightly time clustered strokes, then later an annotation on that phrase is written very near the original phrase). If the user tries to spatially select the annotation, it will be difficult to not include a part of the original phrase, since they are spatially entangled.
1. S is given by some user action.
2. Calculate C(S). Set selection to C(S).
3. Sort the objects in selection by their associated times.

4. Calculate the time differences between adjacent objects in the sorted selection.
5. Find the largest time difference, $D_{max}$, between adjacent objects in selection.
6. Divide selection into two subsets $sel_1$ and $sel_2$ at the place where $D_{max}$ occurred in the sorted selection.
7. Ask the user whether, the user wants to select selection, $sel_1$, or $sel_2$.
8. If the answer is $sel_1$ or $sel_2$, then set selection to the answer ($sel_1$ or $sel_2$), and go back to step 5.
9. Else halt the disentangling of selection.

SPATIAL NEARNESS TEST

This test determines whether it is True that a given object, O, is spatially "near" a given set of objects, selection. There is standard threshold distance, $D_{thresh}$, within which O is always considered to be "near" to selection. Otherwise, the nearness is calculated relative to the spatial density of the objects in selection:

```
calculate D = distance from O to the nearest object in selection
if D < D_thresh, then return True
if selection has only one object, then return False
temp = copy of selection
for each X_i in temp do
  calculate M_i = the distance from X_i to the nearest object in temp
  remove X_i from temp
calculate A = the average of the M_i
calculate S = the standard deviation of the M_i
if D < (A + 2*S)
then return True
else return False
```

TEMPORAL NEARNESS TEST

This test determines whether it is True that a given object, O, is temporally "near" a given set of objects, selection. There is standard threshold time difference, $D_{thresh}$, within which O is always considered to be temporally "near" to selection. Otherwise, the nearness is calculated relative to the temporal density of the objects in selection:

```
calculate D = the time, difference from O to the nearest object in selection
if D < D_thresh, then return True
if selection has only one object, then return False
sort selection so the object are in time order
for each successive X_i (except the last) in selection do
  calculate D_i = the time difference between X_i and X + 1
calculate A = the average of the D_i
calculate S = the standard deviation of the D_i
if D < (A + 2*S)
then return True
else return False
```

It will be obvious that the foregoing algorithms which combine both spatial and temporal groupings is likely to produce in many instances the most appropriate grouping of objects, i.e., groupings of objects that are successfully related to each other and that therefore are most likely to conform to the user's intentions. Once the target objects have been so selected, which can readily be established by storing a value in a selected field of its data structure, or storing pointers to the target objects in a list, then the target objects so selected can be operated on in the same manner as described above.

FIG. 2 illustrates some of the benefits using time-space closure to determine the selected target objects. For example, if "ipe" were created within a short time of the creation of "w", it would be assumed they were both part of the same object 47, though physically separated; in contrast, assuming "B" were later in time created, it would not be selected even though the wipe stroke 50 intersects it. The same approach would cause "OK" to be treated as a single object, even though made up of three separate stroke segments.

The space-time criteria are usually built into the user interface program so as to automatically apply. However, the user can be given control of the space-time mechanisms. FIG. 2, for example, shows two-buttons 60 and 61 for setting parameters of the space-time mechanisms. Thus, when the wipe button 38 is clicked on by the user, followed by clicking on a group space button 60, a menu would pop up that would allow the user to select the parameters desired for pure spatial closure, such as wiper nearness, extent of coverage, etc. When the user clicks on the group time button 61, then a menu would pop up allowing the user to select which time criteria should be combined with the selected space criteria. In its simplest application, the user could select one of the above listed five algorithms for establishing temporal nearness tests for object selection. Other ways of combining a temporal selection aspect with that of a spatial selection aspect are also considered part of our invention.

There has thus been described a novel graphical user interface between a user and a computer-controlled display, as a way of naturally grouping displayed objects for selection for joint treatment then or at some later time. The interface technique described herein is especially useful with whiteboards of the type used for presentations or for its ability to allow hand-sketching of diagrams and the like to exchange ideas with others.

While the invention has been described and illustrated in connection with preferred embodiments, many variations and modifications as will be evident to those skilled in this an may be made therein without departing from the spirit of the invention, and the invention as set forth in the appended claims is thus not to be limited to the precise details of construction set forth above as such variations and modifications are intended to be included within the scope of the appended claims.

What is claimed is:

1. A computer-implemented method for dynamically selecting objects created, modified or referenced at certain times and displayed at certain locations on a computer-controlled display device by manipulating an input device, comprising the steps:
    (a) storing for each displayed object the time that it was created, modified or referenced and its location on the display,
    (b) providing means for a user manipulating the input device to invoke an object selector, said object selector when invoked tracing a path on the display,
    (c) providing means to establish and store space and time object selection criteria for selecting display objects, wherein the space object selection criterion comprises the location of a displayed object relative to the path traced on the display by the object selector, a displayed object satisfying the space object selection criterion when the displayed object location is within, or within a certain distance of, the path traced by the object selector, and the time object selection criterion comprises the time of creation, modification or reference of a displayed object relative to the time of creation, modification or reference of another displayed object satisfying the space object selection criterion, a displayed object satisfying the time object selection criterion when it was created modified or referenced at substantially the same time or within a certain time interval from that of said another displayed object, (d) manipulating the input device to invoke the object selector and thereby identify as selected one or more displayed objects that satisfy the space object selection criterion, (e) collecting the objects identified in step (d), (f) modifying the collection of objects established in step (e) by adding to the collection non-selected displayed objects that satisfy the time object selection criterion, or by deleting from the collection selected displayed objects that do not satisfy the time object selection criterion.

2. The method of claim 1, wherein the object selector comprises a sweep path established by sweeping an applicator across the display.

3. The method of claim 1, wherein the object selector comprises a loop hand drawn by the user on the display.

4. The method of claim 1, wherein the object selector comprises a rectangle formed by the user on the display.

5. The method of claim 1, wherein the object selector comprises a point.

6. The method of claim 1, further comprising providing means to establish a plurality of time and space selection criteria, and step (c) comprises choosing one of the selection criteria from the plurality provided.

7. The method of claim 1, wherein the objects are identified in step (d) by highlighting the selected displayed objects.

8. The method of claim 1, wherein the objects in the modified collection formed by step (f) constitute a group of objects, further comprising the step of subject the group of objects to a current or a subsequent common action.

9. The method of claim 8, wherein the common action is effected as soon as a displayed object is selected.

10. The method of claim 8, wherein the objects identified in step (d) include first objects that are completely in the path traced by the object selector and second objects that are only partly in the path traced by the object selector, and step (f) is applied only to the second objects.

11. The method of claim 8, wherein the certain time interval of step (c) is determined by a given threshold time difference with respect to the time of creation, modification or reference of any object in the group or the average of the time of creation, modification or reference of all the objects in the group.

12. The method of claim 8, wherein the space object selection criterion includes a maximum distance of a non-selected displayed object to a selected displayed object.

13. The method of claim 8, wherein the collecting step (e) is carried out by creating a list of the objects, or pointers to the objects, identified in step (d).

14. The method of claim 13, wherein the common action is effected only after the list has been completed.

15. The method of claim 1, including providing means enabling the user to change the space and time object selection criteria.

16. A computer-implemented method for dynamically selecting objects created, modified or referenced at certain times and displayed at certain locations on a computer-controlled display device by manipulating an input device, comprising the steps:

(a) storing for each displayed object the time that it was created, modified or referenced and its location on the display, (b) providing means for a user manipulating the input device to invoke an object selector, said object selector when invoked tracing a path on the display, (c) providing means to establish and store space and time object selection criteria for selecting display objects, wherein the space object selection criterion comprises the location of a displayed object relative to the path traced on the display by the object selector, a displayed object satisfying the space object selection criterion when the displayed object location is within, or within a certain distance of, the path traced by the object selector, and the time object selection criterion comprises the time of creation, modification or reference of a displayed object relative to the time of creation, modification or reference of another displayed object, a displayed object satisfying the time object selection criterion when it was created modified or referenced at substantially the same time or within a certain time interval from that of said another displayed object, (d) identifying as selected one or more displayed objects that satisfy the time object selection criterion, (e) collecting the objects identified in step (d), (f) manipulating the input device to invoke the object selector to select one or more displayed objects that satisfy the space object criterion, (g) modifying the collection of objects established in step (e) by adding to the collection step (f) non-selected displayed objects that satisfy the space object selection criterion, or by deleting from the collection displayed objects that do not satisfy the space object selection criterion.

17. The method of claim 16, wherein step (d) includes the user requesting the most recently created objects.

18. In a computer system for dynamically selecting objects created, modified or referenced at certain times and displayed at certain locations on a computer-controlled display device by manipulating an input device, the improvement comprising:

(a) first means for storing for each displayed object the time that it was created, modified or referenced and its location on the display, (b) second means in response to a user manipulating the input device to invoke an object selector, said object selector when invoked tracing a path on the display, (c) third means to establish and store space and time object selection criteria for selecting display objects, wherein the space object selection criterion comprises the location of a displayed object relative to the path traced on the display by the object selector, a displayed object satisfying the space object selection criterion when the displayed object location is within, or within a certain distance of, the path traced by the object selector, and the time object selection criterion comprises the time of creation, modification or reference of a displayed object relative to the time of creation, modification or reference of another displayed object satisfying the space object selection criterion, a displayed object satisfying the time object selection criterion when it was created modified or referenced at substantially the same time or within a certain time interval from that of said another displayed object, (d) fourth means in response to invocation of the object to identify as selected one or more displayed objects that satisfy the space object selection criterion, (e) fifth means for collecting the objects identified by the fourth means, (f) sixth means for modifying the collection of objects established by the fifth means by adding to the collection non-selected displayed objects that satisfy the time object selection criterion, or by deleting from the collection selected displayed objects that do not satisfy the time object selection criterion.

19. The system of claim 18, further comprising means in the system for subjecting the objects in the collection to a common action.

* * * * *